United States Patent
Julliand et al.

(10) Patent No.: US 10,227,124 B2
(45) Date of Patent: Mar. 12, 2019

(54) PROPULSION UNIT FOR AN AQUATIC VEHICLE COMPRISING A HYDRAULIC FLUID CONDITIONING MODULE AND A CONDITIONING CONTROL METHOD

(71) Applicant: GE Energy Power Conversion Technology Limited, Rugby, Warwickshire (GB)

(72) Inventors: Lionel Julliand, Beaucourt (FR); Loic Vincent, Franche Comte (FR)

(73) Assignee: GE ENERGY POWER CONVERSION TECHNOLOGY LIMITED, Rugby (GB)

( * ) Notice: Subject to any disclaimer, the term of this patent is extended or adjusted under 35 U.S.C. 154(b) by 0 days.

(21) Appl. No.: 15/496,611

(22) Filed: Apr. 25, 2017

(65) Prior Publication Data
US 2017/0305521 A1 Oct. 26, 2017

(30) Foreign Application Priority Data
Apr. 25, 2016 (EP) .................................... 16305478

(51) Int. Cl.
*B63B 21/38* (2006.01)
*B63H 21/38* (2006.01)
(Continued)

(52) U.S. Cl.
CPC ............. *B63H 21/38* (2013.01); *B63H 5/125* (2013.01); *B63H 23/321* (2013.01);
(Continued)

(58) Field of Classification Search
CPC ........ B63H 21/38; B63H 5/125; B63B 21/38; B63B 5/125
See application file for complete search history.

(56) References Cited

U.S. PATENT DOCUMENTS

| 8,397,871 | B2 * | 3/2013 | Gebert | ................ F16C 33/6625 |
| | | | | 184/5.1 |
| 8,910,751 | B2 * | 12/2014 | Williams, Jr. | ............ F16N 7/22 |
| | | | | 184/6.1 |
| 2008/0110700 | A1 | 5/2008 | Yanohara et al. | |

FOREIGN PATENT DOCUMENTS

| JP | H11-166549 A | 6/1999 |
| WO | 2009/127774 A1 | 10/2009 |

OTHER PUBLICATIONS

Extended European Search Report and Opinion issued in connection with corresponding EP Application No. 16305478.6 dated Oct. 31, 2016.

* cited by examiner

*Primary Examiner* — Stephen P Avila
(74) *Attorney, Agent, or Firm* — GE Global Patent Operation; Scott R. Stanley (57) ABSTRACT

This propulsion unit for an aquatic vehicle consists of a mobile casing mounted in a pivot connection in relation to a hull element of the aquatic vehicle, a drive shaft of a propeller, said shaft being mounted rotatably within the mobile casing by means of at least one bearing consisting of a closed space adapted to be filled with a hydraulic fluid, an electrical machine being adapted to drive the rotary drive shaft in relation to the mobile casing, where the propulsion unit further consists of a module for conditioning the hydraulic fluid contained in the closed space of the bearing. The propulsion unit also consists of a control device to control the conditioning, the control device consisting of a temperature sensor and capable of activating the conditioning of the hydraulic fluid contained in the closed space according to the temperature measured by the temperature sensor.

14 Claims, 2 Drawing Sheets

(51) Int. Cl.
*B63H 5/125* (2006.01)
*B63H 23/32* (2006.01)
*F16C 33/66* (2006.01)
*F16N 29/02* (2006.01)
*F16C 17/24* (2006.01)
*F16C 19/52* (2006.01)
*F16C 33/10* (2006.01)

(52) U.S. Cl.
CPC .......... *F16C 17/243* (2013.01); *F16C 19/525* (2013.01); *F16C 33/105* (2013.01); *F16C 33/667* (2013.01); *F16N 29/02* (2013.01); *B63H 2005/1254* (2013.01); *B63H 2005/1258* (2013.01); *B63H 2023/327* (2013.01); *F16C 2326/30* (2013.01)

PROPULSION UNIT FOR AN AQUATIC VEHICLE COMPRISING A HYDRAULIC FLUID CONDITIONING MODULE AND A CONDITIONING CONTROL METHOD

BACKGROUND

Embodiments of the invention relate to the field of propulsion units for aquatic vehicles, such as ships, submarines, or oil platforms.

These propulsion units, also known as "Propulsion-Oriented Drive" or "POD", generally consist of a movable casing mounted in a pivot connection in relation to a hull element of the aquatic vehicle. The hull element may be e.g. the stern or the prow of a ship. The propulsion unit consists of a propulsion element, which may be e.g. a propeller, integral with a drive shaft rotatably mounted inside the mobile casing and capable of being rotated by means of an electrical machine.

Such a propulsion unit may include rotary bearings provided to permit rotation of the drive shaft in relation to the mobile casing. To limit friction, these bearings may consist of a closed space containing a hydraulic fluid, such as oil or water. Sealing devices, such as gaskets, delimit the closed spaces and have the function of preventing leakage of hydraulic fluid from these closed spaces.

The bearings are often subjected to high mechanical stresses, in particular when the rotation of the drive shaft and the propulsion element occurs over long periods of time. These stresses result in heating of the hydraulic fluid contained in the closed space and the loss of its lubricating properties. This results in premature wear on the bearings.

BRIEF DESCRIPTION

To overcome this disadvantage, a module for conditioning the hydraulic fluid contained in the closed space of the bearing may be provided. The conditioning module is generally designed so as to be able to draw hydraulic fluid into the closed spaces of the bearings, to be able to condition the hydraulic fluid drawn off and then supply the closed space of the bearings with the conditioned hydraulic fluid.

However, this solution is not entirely satisfactory, since the use of the conditioning module causes an excessive pressure inside the closed spaces. All this has an impact on the operation of the sealing devices. This results in dimensioning constraints of the sealing devices that are incompatible with the reduced space of the interior of the mobile casing of the propulsion unit. In addition, the lifetime of these sealing devices is reduced. It may also result in a less tight seal.

An object of embodiments of this invention is to overcome these disadvantages.

More particularly, embodiments of this invention aim to provide a propulsion unit in which the conditioning of the hydraulic fluid contained in the closed space of the bearings is optimized.

According to a first aspect of the embodiment of the invention, a propulsion unit is proposed for an aquatic vehicle consisting of a mobile casing mounted in a pivot connection in relation to a hull element of the aquatic vehicle, a drive shaft of a propulsion element, said shaft being mounted rotatably within the mobile casing by means of at least one bearing consisting of a closed space adapted to be filled with hydraulic fluid, an electrical machine being adapted to drive the rotary drive shaft in relation to the mobile casing, where the propulsion unit further consists of a module for conditioning the hydraulic fluid contained in the closed space of the bearing.

According to a general characteristic of this propulsion unit, a conditioning control device is further provided, consisting of a temperature sensor and capable of activating the conditioning of the hydraulic fluid contained in the closed space according to the temperature measured by the temperature sensor.

Thanks to the control device, it is possible to use the conditioning module only when necessary, so as to limit the occurrence of the excessive pressure phenomenon. This makes it possible, in particular, to improve the operation of the sealing devices. Another advantage is that the energy consumption due to the conditioning of the hydraulic fluid of the shaft bearings is reduced.

The propulsion element may be e.g. a propeller or a pump rotor.

In an embodiment, the temperature sensor is able to measure the temperature of the hydraulic fluid contained in the closed space of the bearing.

The control device is able to select an operating mode from the deactivation of the conditioning, the intermediate activation of the conditioning and the nominal activation of the conditioning.

In an embodiment, the control device consists of means for preventing the circulation of hydraulic fluid in the conditioning module when the selected operating mode is the deactivation of the conditioning.

It is also possible to provide means to circulate the hydraulic fluid intermittently in the conditioning module when the selected operating mode is the intermediate activation of the conditioning.

In an embodiment, the control device consists of means for circulating the hydraulic fluid permanently in the conditioning module when the selected operating mode is the nominal activation of the conditioning.

The control device consists of a mapping in which the selected values of an operating mode are stored according to the temperature measured by the temperature sensor.

In an embodiment, it can be provided that the mapping delivers a deactivation value of the conditioning when the measured temperature is lower than a first temperature threshold and an activation value of the conditioning when the measured temperature is higher than or equal to said first temperature threshold.

It can also be provided that the mapping delivers an intermediate activation value of the conditioning when the measured temperature is lower than a second temperature threshold and a nominal activation value of the conditioning when the measured temperature is higher than or equal to said second temperature threshold.

Several variants are possible, as regards the arrangement and number of sensors.

According to a first variant, the propulsion unit consists of two bearings mounted on the drive shaft on either side of the electrical machine, each bearing consisting of a closed space, the control device consisting of a single temperature sensor capable of measuring the temperature of the hydraulic fluid contained in the closed space of one of the bearings.

Such a variant may be particularly advantageous in that it makes it possible to optimize the conditioning of the hydraulic fluid of two bearings while using only one temperature sensor.

According to a second variant, the propulsion unit consists of a first bearing and a second bearing, the first and second bearings being mounted on the drive shaft on either side of the electrical machine, the first bearing consisting of a first closed space and the second bearing consisting of a second closed space, the control device consisting of a first temperature sensor able to measure the temperature of the hydraulic fluid contained in the first closed space and a second temperature sensor able to measure the temperature of the hydraulic fluid contained in the second closed space, the control device being capable of performing the conditioning, by means of the conditioning module, the hydraulic fluid contained in the first closed space and in the second closed space respectively, according to the temperatures measured by the first sensor and the second sensor.

Such a variant may be advantageous in that it makes it possible to optimize the conditioning of one rotary bearing independently of the other, so as to implement a finer optimization of the conditioning.

It is then possible to provide a first circuit for supplying the first closed space connected to the conditioning module and the first closed space, a second supply circuit for the second closed space connected to the conditioning module and the second closed space, the first and second supply circuits being divided respectively into an upstream portion and a downstream portion, the upstream portion of the first supply circuit and the upstream portion of the second supply circuit being common, the downstream portion of the first supply circuit being distinct from the downstream portion of the second supply circuit, a distribution member delimiting the upstream portion of the first and second supply circuits, the downstream portion of the first supply circuit and the downstream portion of the second supply circuit.

Such an arrangement can be advantageous insofar as a single circulating pump arranged in the common portion is necessary in order to allow the circulation of the hydraulic fluid in the two supply circuits, so as to limit the dimensions required inside the propulsion unit. In addition, the mounting of the pump on the supply lines can be advantageous in that it makes it possible to place the pump in the part of the propulsion unit between the hull element and the drive shaft, said portion consisting of more free space.

The function of the distribution member is to divide the flow of the hydraulic fluid circulating in the upstream portion of the first and second supply circuits into two flows circulating respectively in the downstream portion of the first supply circuit and the downstream portion of the second supply circuit.

For example, the distribution member may consist of two restrictions of different diameters made respectively in the downstream portion of the first supply circuit and in the downstream portion of the second supply circuit. Depending on the selected diameters, a certain fraction, e.g. 30%, of the flow circulating in the upstream portion of the first and second supply circuits will constitute the flow circulating in the downstream portion of the first supply circuit, the remaining fraction, in this case 70%, constituting the flow circulating in the downstream portion of the second supply circuit. With such a distribution member, it is not possible to control the fractions of flow circulating in a downstream portion in relation to the flow circulating in an upstream portion.

According to another example, the distribution member consists of a flap, a distributor or a valve and is controlled by the control device. Although this arrangement is capable of generating greater dimensions, it allows a finer control of the conditioning.

It is also possible to provide a first circuit for discharging the first closed space, connected to the first closed space and to the conditioning module, a second circuit for discharging the second closed space, connected to the second closed space and to the conditioning module, the first and second discharge circuits being divided respectively into an upstream portion and a downstream portion, the upstream portion of the first discharge circuit being distinct from the upstream portion of the second discharge circuit, the downstream portion of the first circuit and the downstream portion of the second discharge circuit being common, a distribution member delimiting the downstream portion of the first and second discharge circuits, the upstream portion of the first discharge circuit and the upstream portion of the second discharge circuit.

Such an arrangement also has the advantage of requiring only a single pump to allow the circulation of the hydraulic fluid in the two evacuation circuits. If the pump must be arranged in a space with little free space, this arrangement has the advantage that the pump sucks the hydraulic fluid present in the first and second closed spaces, so that the pressure created in said closed spaces is lower.

According to another aspect, a method is proposed for controlling a propulsion unit for an aquatic vehicle as described above, in which the temperature of the hydraulic fluid contained in the closed space of the bearing is measured, and then an operating mode of the conditioning of the hydraulic fluid is selected according to the measured temperature, and the conditioning of the hydraulic fluid is performed by the conditioning module according to the selected operating mode.

In an embodiment, the measured temperature is compared with a first threshold and with a third threshold, the third threshold being higher than the first threshold, and then, if the measured temperature is lower than the first threshold, the conditioning of the hydraulic fluid is deactivated as long as the measured temperature remains below the third threshold, and then the conditioning of the hydraulic fluid is activated as soon as the temperature becomes higher than or equal to the third threshold, if the measured temperature is higher than or equal to the third threshold, the conditioning of the hydraulic fluid is activated as long as the measured temperature remains above the first threshold, and then the conditioning of the hydraulic fluid is deactivated as soon as the temperature becomes lower than the first threshold.

In an embodiment, the measured temperature is compared with a second threshold and with a fourth threshold, the fourth threshold being higher than the second threshold, and then, if the measured temperature is lower than the second threshold, the conditioning of the hydraulic fluid is activated as long as the measured temperature remains lower than the fourth threshold, and then the conditioning of the hydraulic fluid is activated permanently as soon as the temperature becomes higher than or equal to the fourth threshold, if the measured temperature is higher than or equal to the fourth threshold, the conditioning of the hydraulic fluid is activated permanently as long as the measured temperature remains above the second threshold, and then the conditioning of the hydraulic fluid is activated as soon as the temperature becomes lower than the second threshold.

BRIEF DESCRIPTION OF THE DRAWINGS

Other objects, characteristics and advantages of the invention will become apparent on reading the following description, given solely by way of non-limiting example, with reference to the accompanying drawings, in which.

DETAILED DESCRIPTION

Figure 1:
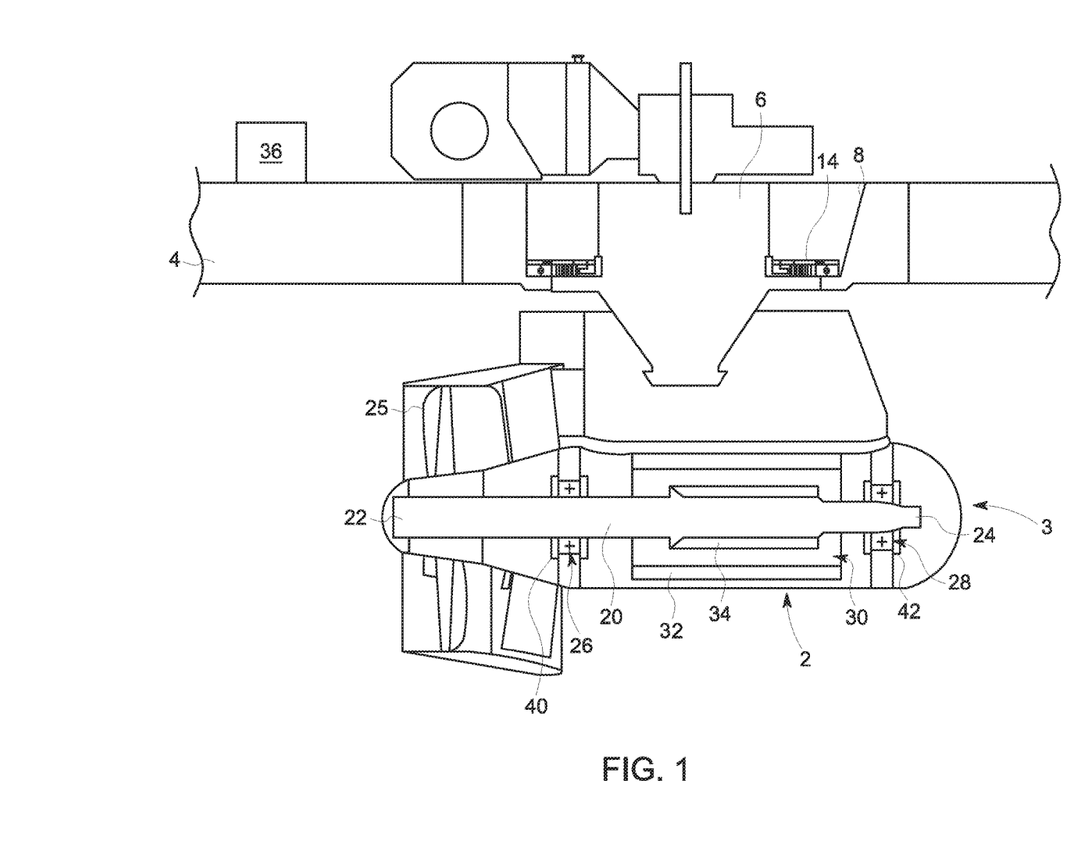
FIG. 1 schematically shows a propulsion unit according to an embodiment of the invention.

FIG. 1 shows a propulsion unit 2 incorporated into a ship (not shown). The propulsion unit 2, in particular, consists of a mobile casing 3 which projects outward toward the exterior from a hull element 4 of the ship, in this case the stern of the ship. With reference to FIG. 1, the space located above the hull element 4 corresponds to the internal volume of the hull, while the space located below it corresponds to the external volume of the hull 4.

The propulsion unit 2 consists of an upper part 6 integral with the mobile casing 3 and inserted inside a bore 8 made in the hull element 4. The upper part 6 consists of a cylindrical portion (not referenced). The bore 8 consists of a cylindrical portion (not referenced) located facing the cylindrical portion of the upper part 6. A rotary azimuth bearing 14 is arranged between the two respective cylindrical portions of the upper part 6 and the bore 8. The azimuth bearing 14 may be e.g. a roller bearing consisting of an inner ring (not shown) integral with the cylindrical portion of the upper part 6, and an outer ring (not shown) integral with the cylindrical portion of the bore 8. A bearing space (not shown) is defined, radially located between the two cylindrical portions mentioned above. Within the bearing space are bearing elements (not shown), which may be rollers, balls or needles.

By means of the azimuth bearing 14, the propulsion unit 2 can pivot about the yaw axis of the ship, in order to orient the propulsion. A motor (not referenced), in this case an electrical machine, is arranged inside the hull element 4 and associated with a transmission element (not referenced) in order to drive the upper part 6 and the mobile casing 3 in rotation.

A drive shaft 20 mounted inside the mobile casing 3 has a first end 22 and a second end 24, opposite the first end 22. A propeller 25 is mounted on the first end 22 and extends radially in relation to the axis of the shaft 20. Although, in the illustrated embodiment, a propeller is used to provide the propulsion, it is not outside the scope of the invention to consider any other type of propulsion element, e.g. a pump rotor. The shaft 20 is rotatably mounted in relation to the mobile casing 3, and in this regard consists of rotary shaft bearings. In this case, a first shaft bearing 26 is provided, located near the first end 22 and a second shaft bearing 28, located near the second end 24. By means of the shaft bearings 26 and 28, the drive shaft 20 and the propeller 25 can be driven in rotation about the axis of the shaft 20, in relation to the mobile casing 3.

In the illustrated embodiment, the shaft bearings 26 and 28 are roller bearings, each consisting of an inner ring (not shown) integral with the shaft 20, and an outer ring (not shown) integral with the mobile casing 3. A bearing space (not shown) is defined in each case and radially delimited by the inner ring and the outer ring. A number of bearing elements (not shown) is arranged within the bearing space. The bearing elements may, in particular, be balls, rollers or even needles. As for the azimuth bearing 14, it is possible, without departing from the scope of the invention, to envisage that the shaft bearings 26 and 28 are bearings with a different design, e.g. bush bearings. According to such a design, each of the bearings 26, 28 consists of an inner annular part integral with the shaft 20 and an outer annular part integral with the mobile casing 3, the inner annular part and the outer annular part being directly in contact or almost in contact with one another.

An electrical machine 30 is provided to drive the shaft 20 and the propeller 25 in rotation. The electrical machine 30 is arranged axially between the shaft bearing 26 and the shaft bearing 28. The electrical machine 30 consists of a stator 32 integral with the mobile casing 3 and a rotor 34 integral with the drive shaft 20.

A hydraulic fluid, e.g. oil, is introduced into the bearing space of the shaft bearing 26 and the shaft bearing 28 in order to limit the friction between the inner ring, the outer ring and the bearing elements. In addition, the same hydraulic fluid is used to lubricate each of the bearings 26 and 28. In the case where one of the bearings 26 and 28 is a bush bearing, the hydraulic fluid is used to create a thin thread of lubricating fluid between the rings almost in contact with one another.

A hydraulic fluid conditioning module 36 is provided inside the hull element 4. The function of the conditioning module 36 is to ensure the conditioning of the hydraulic fluid used to lubricate the bearings 26 and 28, so that this hydraulic fluid continues to have good lubricating properties.

A closed space 40 is provided inside the mobile casing 3 in order to contain the hydraulic fluid used to lubricate the shaft bearing 26. In an embodiment, the closed space 40 contains the bearing space of the shaft bearing 26. The closed space 40 is sealed by means of gaskets (not shown).

In the same way, a closed space 42 is provided inside the mobile casing 3 in order to contain the hydraulic fluid used to lubricate the shaft bearing 28. To this end, the closed space 42 contains the bearing space of the shaft bearing 28. The closed space 42 is also sealed by means of gaskets (not shown).

The closed space 40, the closed space 42 and the conditioning module 36 are fluidically connected by supply and/or discharge circuits, which are shown and detailed with reference to FIG. 2.

For each closed space 40, 42, a supply circuit and a circuit for discharging the hydraulic fluid are provided respectively. The supply circuit is designed so as to be able to supply hydraulic fluid from the conditioning module 36 to the corresponding closed space 40, 42. In contrast, the discharge circuit is provided in order to draw hydraulic fluid from the corresponding closed space 40, 42 and return it to the conditioning module 36.

The supply circuit of the closed space 40 of the shaft bearing 26 consists of a supply line 58. The supply line 58 is, on the one hand, connected to the conditioning module 36 and, on the other hand, is connected to the closed space 40. Similarly, the supply circuit of the closed space 42 of the shaft bearing 28 consists of a supply line 59, being, on the one hand, connected to the conditioning module 36 and, on the other hand, connected to the closed space 42. The line 58 consists of means for circulating, in one direction, the hydraulic fluid from the conditioning module 36 toward the closed space 40. Similarly, the line 59 consists of means for circulating, in one direction, the hydraulic fluid from the conditioning module 36 toward the closed space 42.

Figure 2:
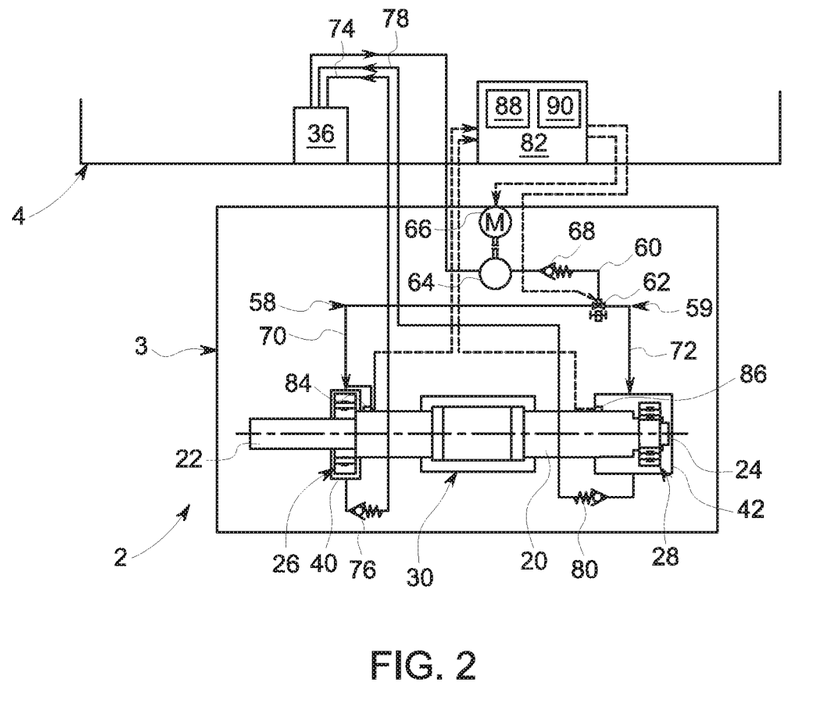
FIG. 2 is a hydraulic diagram of the propulsion unit of FIG. 1.

In the embodiment shown in FIG. 2, the lines 58 and 59 consist of a common portion 60. The common portion 60 extends from the conditioning module 36 to a distribution member 62. In this case, the distribution member is a three-way valve, but it would be possible, without departing from the scope of the invention, to envisage any other type of distribution member, e.g. another controlled valve, a controlled flap, etc. A pump 64 mechanically coupled with a motor 66 is mounted on the common portion 60. A non-return valve 68 is mounted on the common portion 60, between the pump 64 and the three-way valve 62. The valve 68 restricts the direction of circulation of the hydraulic fluid within the common portion 60 in one direction from the conditioning module 36 toward the three-way valve 62 (from left to right and from top to bottom in FIG. 2). Thus, the common portion 60 is located upstream of the three-way valve 62.

Downstream of the three-way valve 62, the line 58 consists of a portion 70 extending from the three-way valve 62 to the closed space 40. Similarly, downstream of the three-way valve 62, the line 59 consists of a portion 72 extending from the three-way valve 62 to the closed space 42. Thus, the respective portions 70 and 72 of the lines 58 and 59, which are located downstream of the three-way valve 62, are totally distinct from one another.

In view of the above, in this embodiment, the supply circuits of the closed spaces 40 and 42 consist of a common portion and a distinct portion. Embodiments of the common portion have the particular advantage of reducing the overall dimensions and design costs, it being understood that a single pump and a single non-return valve are required. By controlling the three-way valve 62 appropriately, it is possible to supply the two closed spaces 40 and 42 with hydraulic fluid, to supply neither of the spaces 40 and 42, or to supply only one of the two spaces. However, alternatively, without departing from the scope of the invention, it is possible to envisage respective supply circuits for the closed spaces 40 and 42 which are totally distinct from one another. In such an embodiment, each supply circuit of a closed space 40, 42 consists of a distinct line connecting the conditioning module 36 to the corresponding closed space 40, 42, a pump and a non-return valve being arranged on each of the lines. Such an alternative embodiment, if it generates greater dimensions and requires a more advanced design, makes it possible to control more finely the exchanges of hydraulic fluid between the conditioning module 36 and the closed spaces 40 and 42.

The discharge circuit of the closed space 40 of the shaft bearing 26 consists of a discharge line 74, fluidically connected, on the one hand, to the closed space 40 and, on the other hand, to the conditioning module 36. A non-return valve 76 is arranged on the line 74, so that the hydraulic fluid can only circulate in the discharge line 74 in one direction, from the closed space 40 toward the conditioning module 36.

Similarly, the discharge circuit of the closed space 42 of the shaft bearing 28 consists of a discharge line 78, fluidically connected, on the one hand, to the closed space 42 and, on the other hand, to the conditioning module 36. The circuit 78 includes a non-return valve 80, mounted so that the hydraulic fluid can only circulate in the discharge line 78 in one direction, from the closed space 42 toward the conditioning module 36.

In this way, for each of the closed spaces 40, 42, the supply circuit and the discharge circuit put in place an exchange loop for the hydraulic fluid with the conditioning module 36. This exchange loop can be controlled by means of the motor 66 and the three-way valve 62.

In order to provide this control, the propulsion unit consists of a control device 82. The control device 82 is, in particular, provided to control the flow of hydraulic fluid between the closed space 40, 42 and the conditioning module 36. In particular, the control device 82 is designed so as to ensure optimal control of the circulation of the hydraulic fluid in order to condition it, so as to prevent the loss of its lubricating properties while preventing the conditioning causing seal defects and wear of the joints delimiting the closed spaces.

To this end, the control device 82 consists of a first temperature sensor 84. The sensor 84 is mounted so as to be able to measure the temperature of the hydraulic fluid contained in the closed space 40. In the embodiment illustrated in FIG. 2, the sensor 84 is mounted inside the closed space 40.

In the same way, the control device 82 consists of a second temperature sensor 86 mounted inside the closed space 42 and capable of measuring the temperature of the hydraulic fluid contained in this space.

As represented by the dotted arrows, the control device 82 collects the signals delivered by the temperature sensors 84 and 86.

In addition, the control device 82 consists of hardware and software means for controlling the activation of the motor 66 mechanically coupled with the pump 64. The control device 82 also consists of hardware and software means for controlling the activation of the three-way valve 62.

More particularly, the control device 82 is provided with the hardware and software means to be able to control, in an alternative way, the supply of the two closed spaces 40 and 42, the supply of closed space 40 alone, the supply of closed space 42 alone or the supply of any of the closed spaces.

When the control device 82 controls the supply of the two closed spaces 40 and 42, the device 82 commands the opening of the three-way valve 62, so that the flow of hydraulic fluid circulating inside the common portion 60 is divided into two equal flows following the downstream portion 70 and the downstream portion 72 respectively. In addition, the motor 66 of the pump 64 is activated at nominal power.

When the control device 82 controls the supply of only the closed space 40, the three-way valve 62 is activated so that the entire flow of hydraulic fluid circulating in the common portion 60 is directed toward the downstream portion 70. In other words, the flow of hydraulic fluid circulating in the downstream portion 72 is zero. In addition, the motor 66 is controlled to operate at reduced power.

Similarly, when the control device 82 controls the supply of only the closed space 42, the three-way valve 62 is activated so that the entire flow of hydraulic fluid circulating in the common portion 60 is directed toward the downstream portion 72. In other words, the flow of hydraulic fluid circulating in the downstream portion 70 is zero. In addition, the motor 66 is controlled to operate at reduced power.

When the control device 82 controls the supply of any of the closed spaces 40, 42, the motor 66 of the pump 64 is stopped and the three-way valve 62 is closed. In this way, the flow of hydraulic fluid circulating in the upstream portion 60 is zero, as are the flows of hydraulic fluid circulating in the downstream portions 70 and 72. In doing so, the control device 82 is capable of activating, or not activating, the conditioning of the hydraulic fluid contained in each closed space 40, 42.

Thus, in the embodiment illustrated in FIG. 2, the control of the conditioning of the hydraulic fluid by the control device 82 is implemented by controlling the motor 66 and the three-way valve 62. However, it is not outside the scope of the invention to envisage a different control of the conditioning. For example, it may be envisaged that the control device 82 controls the conditioning module 36 directly. More particularly, the control device 82 can control the circulation of a cooling liquid inside a cooling circuit.

When the control device 82 stops the circulation of the cooling liquid, the hydraulic fluid circulating in the conditioning module 36 is not cooled. It is then possible to prevent the conditioning of the hydraulic fluid for one or the other of the closed spaces 40, 42, without, however, deactivating the circulation of the fluid in the corresponding supply circuits 58, 59 and discharge circuits 74, 78.

To determine whether the conditioning of the hydraulic fluid contained in the closed space 40 must be activated, the control device 82 consists of a first mapping 88. The first mapping 88 contains values of an operating mode of the conditioning of the hydraulic fluid contained in the closed space 40, according to the temperature measured by the first temperature sensor 84.

More particularly, as soon as the temperature measured by the sensor 84 is lower than a first temperature threshold T0, the mapping 88 delivers a control value of a deactivation of the conditioning. In this case, the control device 82 controls the motor 66 and the valve 62 so as to prevent the supply of the closed space 40 with hydraulic fluid. In the embodiment shown in FIG. 2, the value of the first temperature threshold T0 is between 20° C. and 30° C., and in an embodiment substantially equal to 25° C.

When the temperature measured by the sensor 84 is between the first temperature threshold T0 and a second temperature threshold T1, the mapping 88 delivers a control value of an intermediate activation of the conditioning. In this case, the control device 82 activates the supply of the closed space 40 with hydraulic fluid intermittently. More particularly, in the embodiment shown in FIG. 2, the control device 82 controls the supply of the closed space 40 during a first duration Δ1, and then inhibits the supply of the closed space 40 during a second duration Δ2. In the embodiment illustrated in FIG. 2, the second temperature threshold T1 is between 50° C. and 60° C., and in an embodiment substantially equal to 55° C. In addition, the duration Δ1 is, in an embodiment, between 1 min and 3 min, and in additional embodiments preferably substantially equal to 2 min. The duration Δ2 is in an embodiment between 9 min and 11 min, and in some embodiments preferably substantially equal to 10 min.

When the temperature measured by the sensor 84 is greater than the second temperature threshold T1, the mapping 88 delivers a control value of a nominal activation of the conditioning. In this case, the control device 82 controls the motor 66 and the valve 62 so that the closed space 40 is supplied with hydraulic fluid permanently.

The control device 82 also consists of a second mapping 90. The second mapping 90 contains values of an operating mode of the conditioning of the hydraulic fluid contained in the closed space 42, according to the temperature measured by the first temperature sensor 86. In the same way as for the mapping 88, the mapping 90 delivers three control values. Depending on the control value delivered by the mapping 90, the control device 82 controls the conditioning of the hydraulic fluid contained in the closed space 42 according to an operating mode selected from the deactivation of the conditioning, the intermediate activation of the conditioning and the nominal activation of the conditioning. In the illustrated embodiment, the temperature thresholds of the mapping 90 are the same as for the mapping 88. However, it is not outside the scope of the invention to envisage different temperature thresholds. In addition, the conditioning of the hydraulic fluid contained in the closed space 42 is performed in the same way as the conditioning of the hydraulic fluid contained in the closed space, when the control values delivered by the mappings 88 and 90 are the same. In particular, when an intermediate activation of the conditioning of the hydraulic fluid is performed, the supply of the closed space 42 with hydraulic fluid is activated during a duration substantially equal to Δ1, and then inhibited for a time substantially equal to Δ2.

In this way, by means of the device just described, it is possible to implement the following method.

Firstly, with regard to the hydraulic fluid contained in the closed space 40 of the first bearing 26, the temperature of said hydraulic fluid is measured by means of the sensor 84. The measured value is then introduced into the mapping 88, which delivers a control value of an operating mode. Depending on the temperature measured, the value delivered by the mapping 88 controls the deactivation of the conditioning, the intermediate activation of the conditioning or the nominal activation of the conditioning of the hydraulic fluid contained in the closed space 40.

If the value delivered by the mapping 88 controls the deactivation of the conditioning, the motor 66 and the valve 62 are controlled so that the closed space 40 is not supplied with hydraulic fluid.

If the value delivered controls the intermediate activation of the conditioning, the motor 66 and the valve 62 are controlled so that the closed space 40 is supplied intermittently with hydraulic fluid, and is not supplied the rest of the time.

If the value delivered by the mapping 88 controls the nominal activation of the conditioning, the motor 66 and the valve 62 are controlled so that the closed space 40 is supplied with hydraulic fluid permanently.

In parallel, the same method is used for the hydraulic fluid contained in the closed space 42 of the second bearing 28, by means of the second mapping 90.

In view of the above, it is possible to control the supply of at least one of the closed spaces with conditioned hydraulic fluid based on a relevant parameter determined by a measurement. In doing so, the conditioning of the hydraulic fluid contained in the closed spaces 40 and 42 is controlled. The parameter measured is the temperature of the hydraulic fluid contained in the corresponding closed space 40, 42.

Thus, the conditioning of the hydraulic fluid is controlled so as to be activated only when necessary. For example, by means of such a device and such a method, it is possible to avoid the permanent activation of the conditioning of the hydraulic fluid contained in the closed spaces 40 and 42 when the vessel is operating in cold water. In this case, the conditioning of the hydraulic fluid is generally unnecessary, since the hydraulic fluid is cooled by the seawater naturally. Under these conditions, the occurrence of an excessive pressure in the interior of the closed spaces 40 and 42 is prevented. Hydraulic fluid leakage and resulting damage to the seals are thus prevented.

In addition, an intermediate activation control of the conditioning is provided, according to which the conditioning is performed intermittently. Embodiments of this control are particularly advantageous, because it limits the excessive elevation of the temperature of the hydraulic fluid without causing the excessive pressures that are liable to be encountered following the implementation of permanent conditioning over a long duration.

According to a variant of this method, the measured temperature is compared to four temperature thresholds instead of only two temperature thresholds. More particularly, in addition to the first and second thresholds T0 and T1, we define a third threshold T2 between the first threshold and the second threshold, and a fourth threshold T3 greater than the second threshold. We then have:

$T_0 < T_2 < T_1 < T_3$

According to this variant, the operating mode selected for conditioning the hydraulic fluid whose temperature is measured is:

the deactivation of the conditioning when the measured temperature is lower than the first threshold $T_0$ (interval A), the intermediate activation of the conditioning when the measured temperature is between the third threshold $T_2$ and the second threshold $T_1$ (interval B), and the nominal activation of the conditioning when the temperature is higher than the fourth threshold $T_3$ (interval C).

In addition, when the measured temperature changes from a value within one of the intervals A, B and C defined above to a value not within these intervals (between $T_0$ and $T_1$ or between $T_2$ and $T_3$), the selected operating mode remains the same until the measured temperature assumes a value within said intervals A, B, or C. Once the measured temperature is again within one of the intervals A, B or C, the rule specified above is applied.

For example, the third temperature threshold $T_2$ is greater by a value of 1° C. to 3° C. than the first threshold $T_0$. Similarly, the fourth temperature threshold $T_3$ is greater by a value of 1° C. to 3° C. than the second threshold $T_1$.

Such a variant of the method which has been presented is advantageous in some embodiments because when the operating mode is selected, the threshold taken into consideration depends on whether the operating mode is changed in one direction or another thus may not be the same. For example, the threshold taken into consideration is not the same, when switching from the deactivation mode toward the intermediate activation mode, and when switching from the intermediate activation mode to the deactivation mode. This offset between the thresholds makes it possible to avoid changing the operating mode too frequently, which would have the effect of prematurely using the motor 66, the valve 62 and all the other constituent elements of the propulsion unit 2 allowing conditioning of the hydraulic fluid.

In the embodiment illustrated in FIG. 2, the operating mode of the conditioning is selected according to the temperature of the hydraulic fluid contained in the corresponding closed space. However, without departing from the scope of the invention, it is possible to envisage a selection according to another parameter. For example, the control device 82 may consist of a single temperature sensor arranged in one of the closed spaces 40, 42. In this case, the conditioning of the hydraulic fluid contained in the closed spaces 40 and 42 is performed simultaneously, according to the temperature measured by the single temperature sensor. While it does not allow a control of the conditioning of the hydraulic fluid as fine as the control described with reference to the figures, this arrangement can prove advantageous in that it requires only a single temperature sensor. This results in reduced dimensions and easier installation of the electronic elements inside the mobile casing 3, as well as a reduced manufacturing cost.

In another alternative embodiment, the temperature sensor may be arranged so as to measure another temperature, for example that of seawater in the vicinity of the mobile casing 3.

In view of the above, the device and the method associated with it make it possible, in particular, to implement a control of the conditioning of the hydraulic fluid serving to lubricate the bearings of the propeller drive shaft, so as to activate the conditioning only when necessary. This results in optimal lubrication of the bearings, in particular causing less wear on the gaskets and preventing leakage of hydraulic fluid as much as possible.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A propulsion unit for an aquatic vehicle comprising:
   a mobile casing mounted in a pivot connection in relation to a hull element of the aquatic vehicle;
   a drive shaft of a propulsion element, said shaft being mounted rotatably within the mobile casing by means of at least one bearing comprising;
      a closed space adapted to be filled with hydraulic fluid; and
      an electrical machine being adapted to drive the rotary drive shaft in relation to the mobile casing; and
   wherein the propulsion unit comprises:
      a module for conditioning the hydraulic fluid contained in the closed space of the bearing; and
      a control device for the conditioning, the control device comprising a temperature sensor and being adapted to activate the conditioning of the hydraulic fluid contained in the closed space according to the temperature measured by the temperature sensor, the temperature sensor adapted to measure the temperature of the hydraulic fluid contained in the closed space of the bearing.

2. A propulsion unit according to claim 1, wherein the control device is able to select an operating mode from the deactivation of the conditioning, the intermediate activation of the conditioning and the nominal activation of the conditioning.

3. A propulsion unit according to claim 2, wherein the control device consists of means for preventing the circulation of hydraulic fluid in the conditioning module when the selected operating mode is the deactivation of the conditioning.

4. A propulsion unit according to claim 2, wherein the control device consists of means for circulating the hydraulic fluid in the conditioning module intermittently when the selected operating mode is the intermediate activation of the conditioning.

5. A propulsion unit according to claim 2, wherein the control device consists of means for circulating the hydraulic fluid in the conditioning module permanently when the selected operating mode is the nominal activation of the conditioning.

6. A propulsion unit according to claim 1, wherein the control device consists of a mapping in which the selected values of an operating mode are stored according to the temperature measured by the temperature sensor.

7. A propulsion unit according to claim 6, wherein the mapping delivers a deactivation value of the conditioning when the measured temperature is lower than a first temperature threshold, and an activation value of the conditioning when the measured temperature is higher than or equal to said first temperature threshold.

8. A propulsion unit according to claim 6, wherein the mapping delivers an intermediate activation value of the conditioning when the measured temperature is lower than a second temperature threshold ($T_1$), and a nominal activation value of the conditioning when the measured temperature is higher than or equal to said second temperature threshold ($T_1$).

9. A propulsion unit according to claim 1, further comprising a first bearing and a second bearing, the first and second bearings being mounted on the drive shaft on either side of the electrical machine, the first bearing comprising a first closed space and the second bearing comprising a second closed space, the control device comprising a first temperature sensor able to measure the temperature of the hydraulic fluid contained in the first closed space, and a second temperature sensor able to measure the temperature of the hydraulic fluid contained in the second closed space, the control device being capable of performing the conditioning, by means of the conditioning module, the hydraulic fluid contained in the first closed space and in the second closed space respectively, according to the temperatures measured by the first sensor and the second sensor.

10. A propulsion unit according to claim 9, further comprising a first supply circuit of the first closed space connected to the conditioning module and the first closed space, a second supply circuit for the second closed space connected to the conditioning module and the second closed space, the first and second supply circuits being divided respectively into an upstream portion and a downstream portion, the upstream portion of the first supply circuit and the upstream portion of the second supply circuit being common, the downstream portion of the first supply circuit being distinct from the downstream portion of the second supply circuit, a three-way valve delimiting the upstream portion of the first and second supply circuits, the downstream portion of the first supply circuit and the downstream portion of the second supply circuit.

11. A propulsion unit according to claim 9, further comprising a first circuit for discharging the first closed space, connected to the first closed space and to the conditioning module, a second circuit for discharging the second closed space, connected to the second closed space and to the conditioning module, the first and second discharge circuits being divided respectively into an upstream portion and a downstream portion, the upstream portion of the first discharge circuit being distinct from the upstream portion of the second discharge circuit, the downstream portion of the first circuit and the downstream portion of the second discharge circuit being common, a distribution member delimiting the downstream portion of the first and second discharge circuits, the upstream portion of the first discharge circuit and the upstream portion of the second discharge circuit.

12. A method of controlling a propulsion unit according to claim 1, wherein the temperature of the hydraulic fluid contained in the closed space of the bearing is measured, and then an operating mode of the conditioning of the hydraulic fluid is selected according to the measured temperature, and the conditioning of the hydraulic fluid is performed by the conditioning module according to the selected operating mode.

13. A control method according to claim 12, wherein the measured temperature is compared with a first threshold and a third threshold, the third threshold being higher than the first threshold, and then,
  if the measured temperature is lower than the first threshold, the conditioning of the hydraulic fluid is deactivated as long as the measured temperature remains below the third threshold, and then the conditioning of the hydraulic fluid is activated as soon as the temperature becomes higher than or equal to the third threshold,
  if the measured temperature is higher than or equal to the third threshold, the conditioning of the hydraulic fluid is activated as long as the measured temperature remains above the first threshold, and then the conditioning of the hydraulic fluid is deactivated as soon as the temperature becomes lower than the first threshold.

14. A control method according to claim 12, wherein the measured temperature is compared with a second threshold and a third threshold, the fourth threshold being higher than the second threshold, and then,
  if the measured temperature is lower than the second threshold, the conditioning of the hydraulic fluid is activated intermediately as long as the measured temperature remains below the fourth threshold, and then the conditioning of the hydraulic fluid is activated permanently as soon as the temperature becomes higher than or equal to the fourth threshold,
  if the measured temperature is higher than or equal to the fourth threshold, the conditioning of the hydraulic fluid is activated permanently as long as the measured temperature remains above the second threshold, and then the conditioning of the hydraulic fluid is activated as soon as the temperature becomes lower than the second threshold.

* * * * *